United States Patent
Yang (10) Patent No.: US 9,223,190 B1
(45) Date of Patent: Dec. 29, 2015

(54) HANGER DEVICE FOR CAMERA/FILMING EQUIPMENT

(71) Applicant: Ming-Kung Yang, Taoyuan (TW)

(72) Inventor: Ming-Kung Yang, Taoyuan (TW)

( * ) Notice: Subject to any disclaimer, the term of this patent is extended or adjusted under 35 U.S.C. 154(b) by 0 days.

(21) Appl. No.: 14/725,197

(22) Filed: May 29, 2015

(51) Int. Cl.
*G03B 17/56* (2006.01)
*F16M 11/04* (2006.01)
*A45F 5/00* (2006.01)

(52) U.S. Cl.
CPC ............... *G03B 17/561* (2013.01); *A45F 5/00* (2013.01); *F16M 11/041* (2013.01); *A45F 2005/006* (2013.01)

(58) Field of Classification Search
CPC .................................................. G03B 17/561
USPC ........................................................ 396/419
See application file for complete search history.

(56) References Cited

U.S. PATENT DOCUMENTS

| | | | | |
|---|---|---|---|---|
| 8,567,952 B2* | 10/2013 | Taylor | ................... | B66F 11/048 352/243 |
| 2013/0302023 A1* | 11/2013 | Chamberlayne | ..... | F16M 11/041 396/423 |
| 2014/0050468 A1* | 2/2014 | Henry | ................... | G03B 17/561 396/423 |
| 2014/0099093 A1* | 4/2014 | Johnson, Sr. | ......... | G03B 17/561 396/428 |

\* cited by examiner

*Primary Examiner* — Clayton E Laballe
*Assistant Examiner* — Dennis Hancock
(74) *Attorney, Agent, or Firm* — Rosenberg, Klein & Lee (57) ABSTRACT

A hanger device for camera/filming equipment includes: a base seat having a hanging slide channel with an opening at one end and a terminal section at the other end to define a latching section; a floating tenon and a restoring latching slide tenon disposed outside the latching section and floatable/sinkable in the hanging slide channel; and a latching/unlatching unit disposed on the base seat. The quick release structure locked with the camera/filming equipment can be freely slid into the hanging slide channel in any of four directions and hung in the hanging slide channel in a fixed direction without swinging. The floating tenon serves to latch the quick release structure in the latching section. The latching/unlatching unit serves to control the floating tenon to sink or protrude into the hanging slide channel so as to unlatch the quick release structure or restore the floating tenon to the latchable state.

9 Claims, 13 Drawing Sheets

HANGER DEVICE FOR CAMERA/FILMING EQUIPMENT

BACKGROUND OF THE INVENTION

1. Field of the Invention

The present invention relates generally to a hanger device for camera/filming equipment.

2. Description of the Prior Art

A conventional slide-channel-type quick release plate is used to quickly mount a camera/filming equipment on a tripod for use. In order to readily grasp a rare fleeing picture, an amateur photographer often carries two sets of camera/filming equipments with him/her. The two sets of camera/filming equipments are respectively equipped with long-focus and short-focus lenses with different focal lengths or special lenses for readily grasping the rare fleeing pictures. Moreover, for seeking a desired picture, an amateur photographer often stays in a field to on one hand take the picture and on the other hand search and expect a rare picture. At this time, the sling strap hanging on the shoulder or the neck will inevitably swing along with the motion of the amateur photographer. As a result, the camera/filming equipments suspending from the lower end of the sling strap often collide each other along with the shaking of the body of the amateur photographer. To solve this problem, the camera/filming equipments can be hung on the waist of the amateur photographer instead of suspending from the lower end of the sling strap.

U.S. Patent Application Publication No. 2011/0142436 discloses an equipment holster for coupling a camera with a garment or the like, for example, a waist strap of a user. The equipment holster includes a camera connection substrate, which can be coupled with a protection stop assembly via a coupling pin. The equipment holster permits a user to rotate the camera relative to the protection stop assembly.

However, when a user or a photographer seeks or expects a rare picture or takes a shot, the body of the user will sometimes move forward and sometimes move backward or crouch down or stand up. All these non-stationary motions will lead to shaking and swinging of the camera/filming equipments hung on the waist. The camera/filming equipments not only will hit the body of the user or the photographer to cause uncomfortableness, but also will oscillate to cause a damping effect to affect the mobility of the user or the photographer.

Furthermore, according to the equipment holster disclosed in U.S. Patent Application Publication No. 2011/0142436, after the latch is unlatched, when the user again hangs the camera/filming equipment back into the equipment holster, the latch cannot automatically latch the camera/filming equipment. During the motion of the user, the camera/filming equipment is apt to drop out of the equipment holster onto the ground and damage.

It is therefore tried by the applicant to provide a hanger device for camera/filming equipment to solve the above problems. According to the hanger device for camera/filming equipment, once the camera/filming equipment is hung into the hanger device, the camera/filming equipment is automatically latched without possibility of dropping out.

According to the hanger device for camera/filming equipment of the present invention, a user can hang the camera/filming equipment into the hanging slide channel in a desired direction and latch the camera/filming equipment in a fixed direction without shaking or swinging. Therefore, the camera/filming equipment will not interfere with the motion of the user. In this case, the user can more reassuringly and fluently move his/her body to perform various shooting activities.

SUMMARY OF THE INVENTION

It is therefore a primary object of the present invention to provide a hanger device for camera/filming equipment. The camera/filming equipment is connected with a quick release structure. The quick release structure at least has a first slide connection section. The hanger device for camera/filming equipment of the present invention includes:

(A) a base seat including a hanging slide channel, the hanging slide channel having an opening formed at one end of the hanging slide channel for the first slide connection section of the quick release structure to slide from the opening into the hanging slide channel, the base seat further including a terminal section disposed at the other end of the hanging slide channel for bracketing one end of the first slide connection section to stop the first slide connection section from further sliding along the hanging slide channel;

(B) a floating tenon elastically disposed on the base seat and distal from the terminal section, whereby the floating tenon can protrude into the hanging slide channel in a floating state or sink out of the hanging slide channel, the floating tenon and the terminal section together defining a latching section in the hanging slide channel, when the floating tenon protrudes into the hanging slide channel in a floating state, the floating tenon stopping one side of the first slide connection section of the quick release structure to latch the first slide connection section in the latching section, when the floating tenon sinks out of the hanging slide channel, the first slide connection section being permitted to slide out of the hanging slide channel from the opening thereof to separate from the hanging slide channel;

(C) a restoring latching slide tenon elastically and floatably/sinkably disposed on the base seat, the restoring latching slide tenon being positioned outside the latching section in the hanging slide channel, in the separation travel of the first slide connection section of the quick release structure from the hanging slide channel, the restoring latching slide tenon being depressed by the first slide connection section to sink out of the hanging slide channel, when the floating tenon sinks out of the hanging slide channel in an unlatched state, the restoring latching slide tenon elastically protruding into the hanging slide channel in a floating state, in a floating/sinking cycle, the restoring latching slide tenon serving to restore the floating tenon and keep the floating tenon in a restoring latching state; and (D) a latching/unlatching unit disposed on the base seat for driving the floating tenon to latch/unlatch the first slide connection section and driving the restoring latching slide tenon to restore the floating tenon to the restoring latching state.

In the above hanger device for camera/filming equipment, the floating tenon further has:

(A) a latching face directed to the terminal section to stop the other end of the first slide connection section of the quick release structure and latch the first slide connection section in the latching section; and (B) a first guide slide slope directed away from the latching face, permitting the first slide connection section of the quick release structure to slidably press against the first guide slide slope to smoothly depress and sink the floating tenon out of the hanging slide channel.

In the above hanger device for camera/filming equipment, the restoring latching slide tenon further has a second guide slide slope. In the unlatched state, the second guide slide slope protrudes into the hanging slide channel in a floating state. One end of the second guide slide slope is defined as a start end of the second guide slide slope. The start end is directed to the terminal section, whereby in the sliding travel of the first slide connection section of the quick release structure out of the latching section, the start end can guide the first slide connection section to slidably press thereagainst to smoothly depress and sink the restoring latching slide tenon out of the hanging slide channel. The other end of the second guide slide slope is defined as a terminal end of the second guide slide slope. The terminal end is directed away from the terminal section.

In the above hanger device for camera/filming equipment, the latching/unlatching unit further includes:

(A) a first elastic member, the first elastic member directly or indirectly acting between the base seat and the floating tenon and directly or indirectly acting between the base seat and the restoring latching slide tenon to make the floating tenon and the restoring latching slide tenon respectively elastically protrude into the hanging slide channel in a floating state;

(B) a controlling/locking member slidably disposed on the base seat, the controlling/locking member having:

(a) a press section protruding out of the base seat for a user to press so as to slide the controlling/locking member relative to the base seat, when the press section protrudes out of the base seat, the press section being positioned in a first position, when the press section retracts into the base seat, the press section being positioned in a second position;

(b) a first protrusion section in driving contact with the floating tenon for sinking the floating tenon out of the hanging slide channel; and (c) a second protrusion section in driving contact with the restoring latching slide tenon for sinking the restoring latching slide tenon out of the hanging slide channel; and (d) a latch section, when the press section is retracted into the base seat, the latch section latching one of the floating tenon, the restoring latching slide tenon and the base seat to keep the floating tenon in an unlatched state and keep the restoring latching slide tenon in a restoring latching state; and (C) a second elastic member directly or indirectly acting between the controlling/locking member and the base seat to keep the controlling/locking member in the latched state and keep the press section of the controlling/locking member positioned in the first position.

The above hanger device for camera/filming equipment further includes a pass hanger member fixedly connected with the base seat. The pass hanger member has two slots respectively formed on two sides of the pass hanger member and extending along two sides of the opening of the hanging slide channel for a strap member to pass therethrough so as to pass and hang the hanger device for camera/filming equipment on the strap member.

The above hanger device for camera/filming equipment further includes a controlling/locking seat. The floating tenon, the restoring latching slide tenon, the first elastic member, the controlling/locking member and the second elastic member are all drivably mounted in the controlling/locking seat.

In the above hanger device for camera/filming equipment, the first elastic member has the form of a plate. The first elastic member has:

(A) a base section directly fixed with the controlling/locking seat;

(B) a first elastic section integrally formed with the base section to act on the floating tenon; and (C) two second elastic sections respectively integrally formed with the base section and positioned on two sides of the first elastic section, the two second elastic sections respectively acting on the restoring latching slide tenon.

In the above hanger device for camera/filming equipment, the two slots of the pass hanger member are integrally formed on the pass hanger member.

In the above hanger device for camera/filming equipment, the base seat further includes a guide slide section in adjacency to the opening of the hanging slide channel. The guide slide section has a guide slide slope and two guide sidewalls positioned on two sides of the guide slide slope. A width between the two guide sidewalls is larger than a width of the opening of the hanging slide channel.

The present invention can be best understood through the following description and accompanying drawings, wherein:

DETAILED DESCRIPTION OF THE PREFERRED EMBODIMENTS

Please refer to FIGS. 1 to 18. The present invention provides a hanger device 30 for camera/filming equipment. The camera/filming equipment 20 is connected with a quick release structure 21. The quick release structure 21 at least has a first slide connection section 22. The hanger device 30 for camera/filming equipment includes a base seat 40, a floating tenon 50, a restoring latching slide tenon 60 and a latching/unlatching unit 70.

Figure 8:
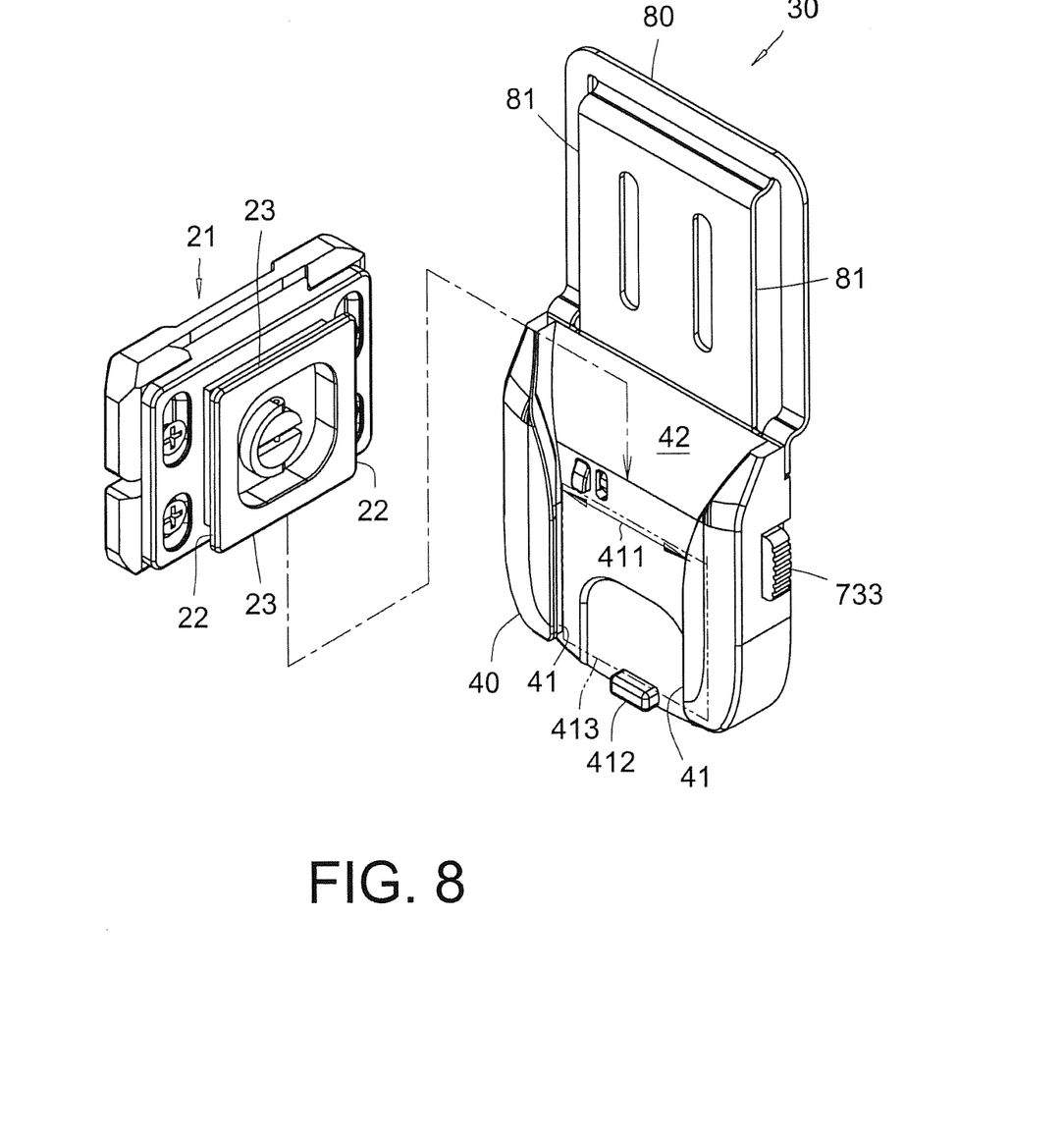
FIG. 8 is a perspective view of the present invention, showing that the present invention is adapted to a quick release structure.
Figure 9:
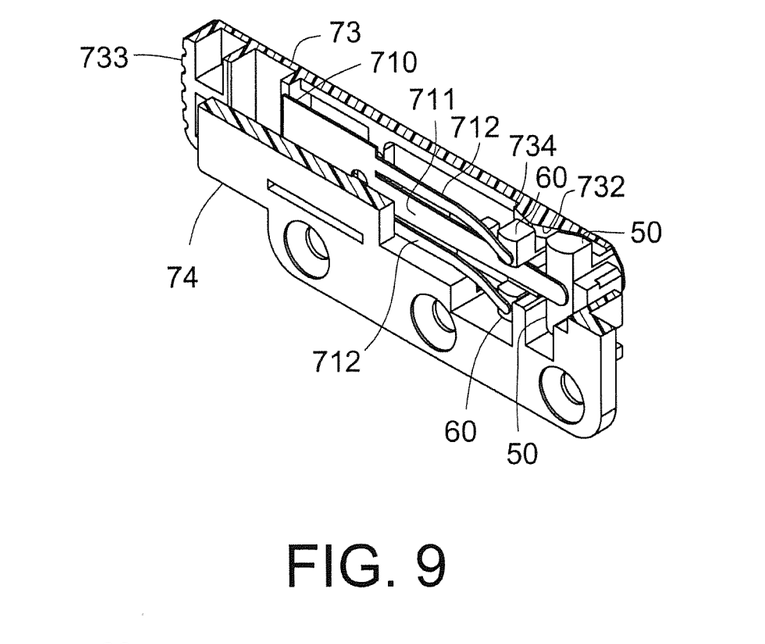
FIG. 9 is a perspective sectional taken along line 9-9 of FIG. 7, showing that the floating tenon is in a latched state.

Please now refer to FIG. 8. In the hanger device 30 for camera/filming equipment of the present invention, the quick release structure 21 has a second slide connection section 23 in addition to the first slide connection section 22. The second slide connection section 23 is perpendicular to the first slide connection section 22, whereby a user can freely select the hanging direction.

Please refer to FIGS. 1, 5, 8, 11 and 16 to 18. In the hanger device 30 for camera/filming equipment of the present invention, the base seat 40 includes a hanging slide channel 41 having an opening 411 formed at one end of the hanging slide channel 41 for the first slide connection section 22 of the quick release structure 21 to slide from the opening 411 into the hanging slide channel 41. The base seat 40 further includes a terminal section 412 disposed at the other end of the hanging slide channel 41 for bracketing one end of the first slide connection section 22 to stop the first slide connection section 22 from further sliding along the hanging slide channel 41.

Please refer to FIGS. 1, 8, 11 and 16 to 18. In the hanger device 30 for camera/filming equipment of the present invention, the floating tenon 50 is elastically disposed on the base seat 40 and distal from the terminal section 412. The floating tenon 50 can pass through a perforation 414 of the base seat 40 to protrude into the hanging slide channel 41 in a floating state or sink out of the hanging slide channel 41. The floating tenon 50 and the terminal section 412 together define a latching section 413 in the hanging slide channel 41. When the floating tenon 50 protrudes into the hanging slide channel 41 in a floating state, the floating tenon 50 can stop one side of the first slide connection section 22 of the quick release structure 21 to latch the first slide connection section 22 in the latching section 413. When the floating tenon 50 sinks out of the hanging slide channel 41, the first slide connection section 22 is permitted to slide out of the hanging slide channel 41 from the opening 411 thereof to separate from the hanging slide channel 41.

Please refer to FIGS. 1 to 18. In the hanger device 30 for camera/filming equipment of the present invention, the restoring latching slide tenon 60 passes through a perforation 415 of the base seat 40 and is elastically and floatably/sinkably disposed on the base seat 40. The restoring latching slide tenon 60 is positioned outside the latching section 413 of the hanging slide channel 41. In the separation travel of the first slide connection section 22 of the quick release structure 21 from the hanging slide channel 41, the restoring latching slide tenon 60 is depressed by the first slide connection section 22 to sink out of the hanging slide channel 41. When the floating tenon 50 sinks out of the hanging slide channel 41 in an unlatched state, the restoring latching slide tenon 60 elastically protrudes into the hanging slide channel 41 in a floating state. In a floating/sinking cycle, the restoring latching slide tenon 60 serves to restore the floating tenon 50 and keep the floating tenon 50 in a restoring latching state.

Please refer to FIGS. 1 to 5 and 11 to 13. In the hanger device 30 for camera/filming equipment of the present invention, the floating tenon 50 further has a latching face 51 and a first guide slide slope 52. The latching face 51 is directed to the terminal section 412 to stop the other end of the first slide connection section 22 of the quick release structure 21 and latch the first slide connection section 22 in the latching section 413. The first guide slide slope 52 is directed away from the latching face 51, permitting the first slide connection section 22 of the quick release structure 21 to slidably press against the first guide slide slope 52 to smoothly depress and sink the floating tenon 50 out of the hanging slide channel 41.

Please refer to FIGS. 4 and 11 to 14. In the hanger device 30 for camera/filming equipment of the present invention, the restoring latching slide tenon 60 further has a second guide slide slope 61. In the unlatched state, the second guide slide slope 61 protrudes into the hanging slide channel 41 in a floating state. One end of the second guide slide slope 61 is defined as a start end 611 of the second guide slide slope 61. The start end 611 is directed to the terminal section 412, whereby in the sliding travel of the first slide connection section 22 of the quick release structure 21 out of the latching section 413, the start end 611 can guide the first slide connection section 22 to slidably press thereagainst to smoothly depress and sink the floating tenon 50 out of the hanging slide channel 41. The other end of the second guide slide slope 61 is defined as a terminal end 612 of the second guide slide slope 61. The terminal end 612 is directed away from the terminal section 412.

Figure 1:
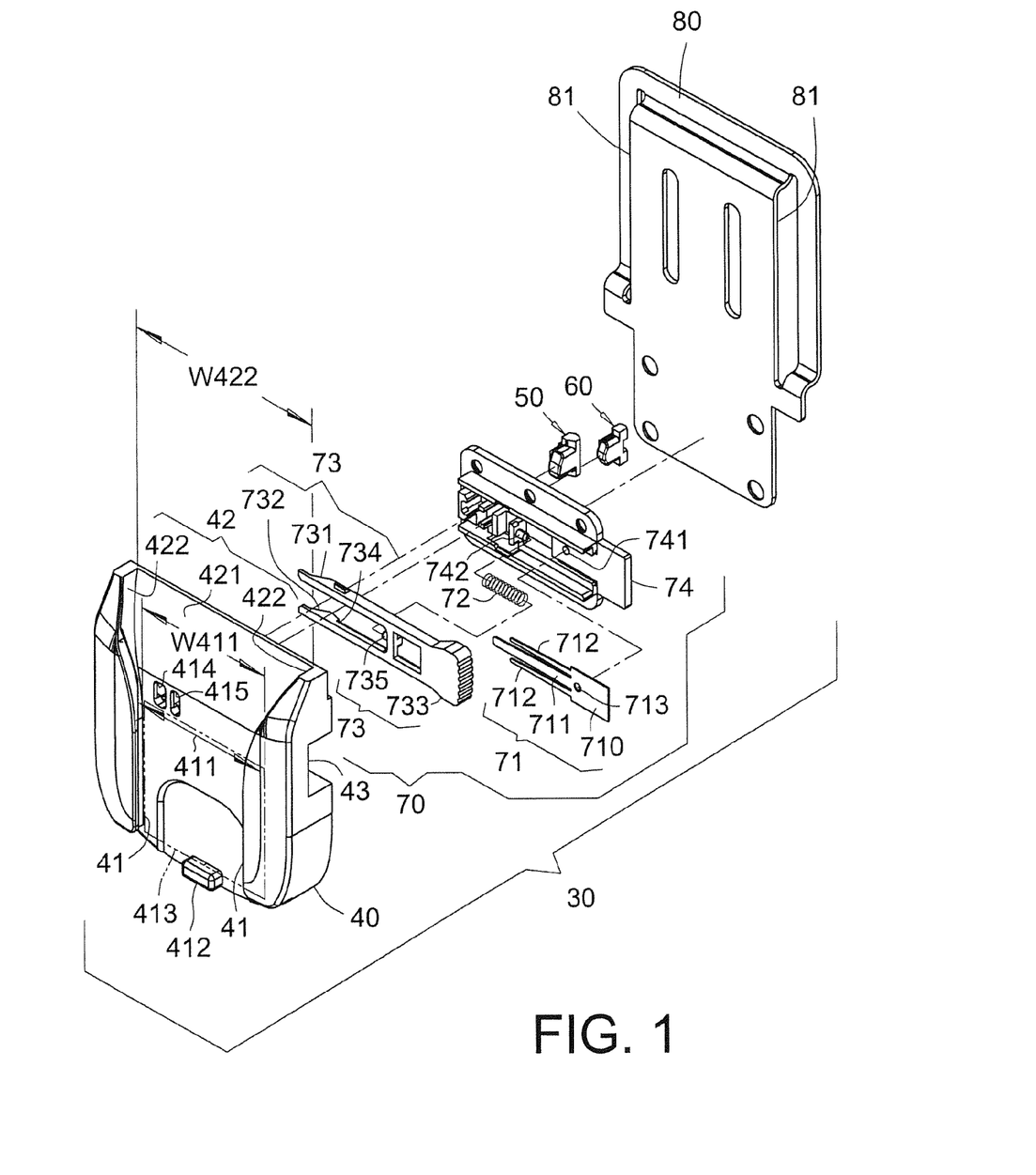
FIG. 1 is a perspective exploded view of the present invention.
Figure 2:
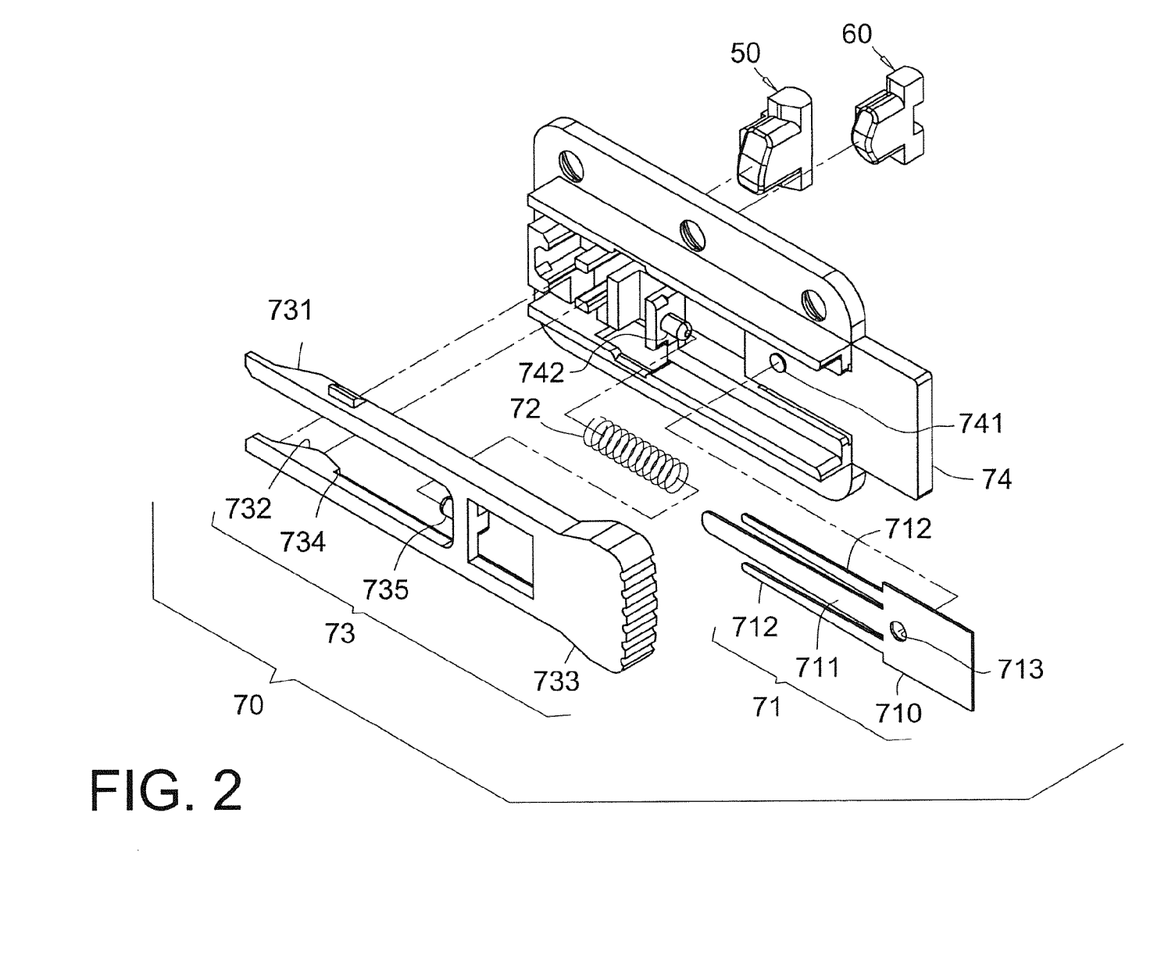
FIG. 2 is a perspective exploded view of a part of the present invention, showing the latching/unlatching unit, floating tenon and restoring latching slide tenon of FIG. 1.
Figure 4:
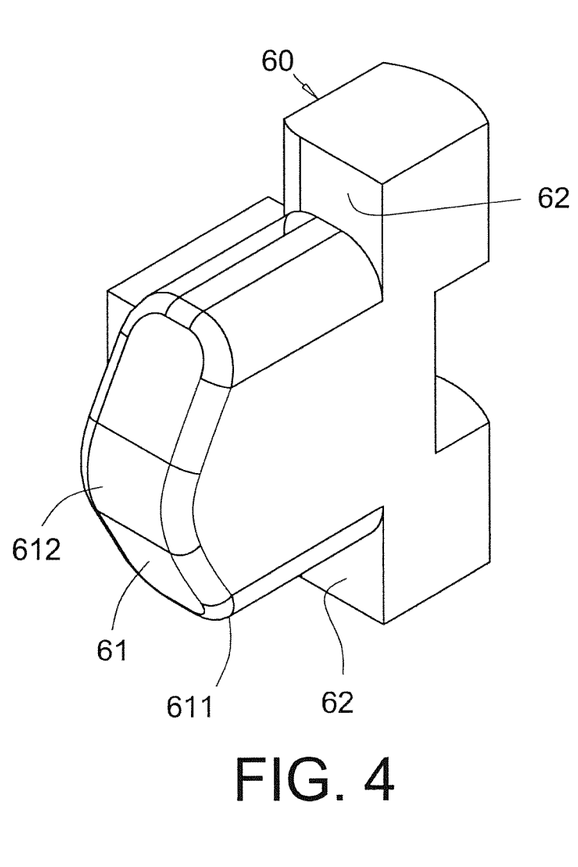
FIG. 4 is a perspective enlarged view of the restoring latching slide tenon of the present invention.

Please refer to FIGS. 1, 4 and 8. In the hanger device 30 for camera/filming equipment of the present invention, the restoring latching slide tenon 60 further has a second guide slide slope 61. In the unlatched state, the second guide slide slope 61 protrudes into the hanging slide channel 41 in a floating state. One end of the second guide slide slope 61 is defined as a start end 611 of the second guide slide slope 61. The start end 611 is directed to the terminal section 412, whereby in the sliding travel of the first slide connection section 22 of the quick release structure 21 out of the latching section 413, the start end 611 can guide the first slide connection section 22 to slidably press thereagainst to smoothly depress and sink the restoring latching slide tenon 60 out of the hanging slide channel 41. The other end of the second guide slide slope 61 is defined as a terminal end 612 of the second guide slide slope 61. The terminal end 612 is directed away from the terminal section 412.

Figure 5:
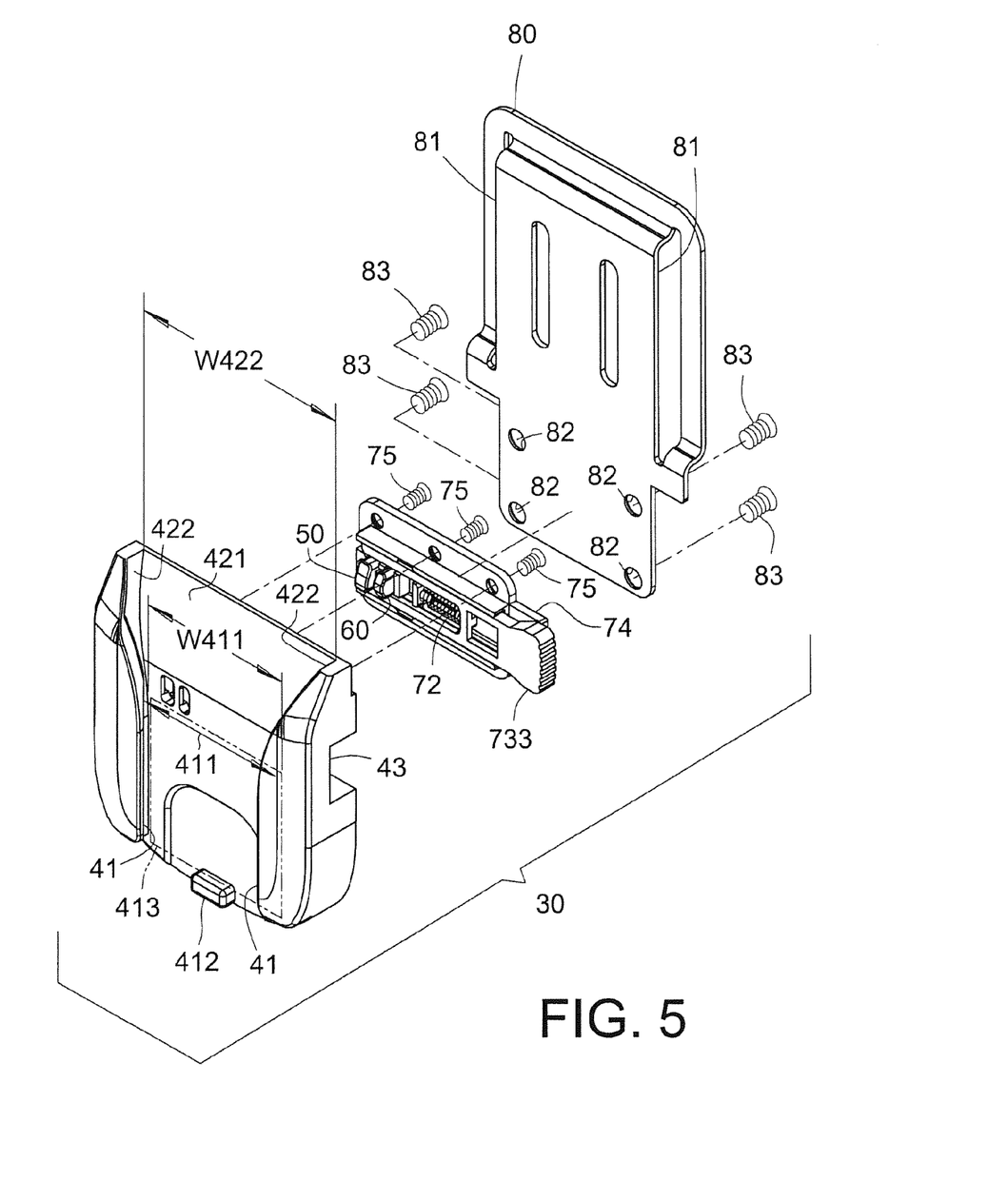
FIG. 5 is a perspective partially assembled view of the present invention according to FIG. 1.
Figure 6:
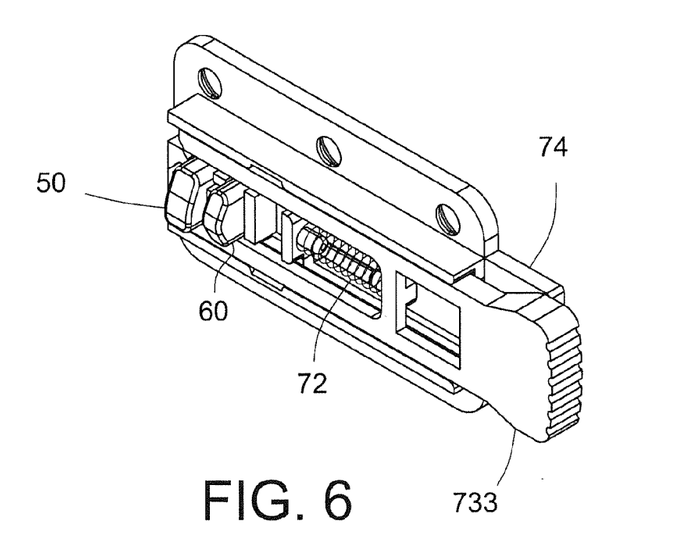
FIG. 6 is a front perspective assembled view of the floating tenon, the restoring latching slide tenon and the latching/unlatching unit of the present invention.
Figure 7:
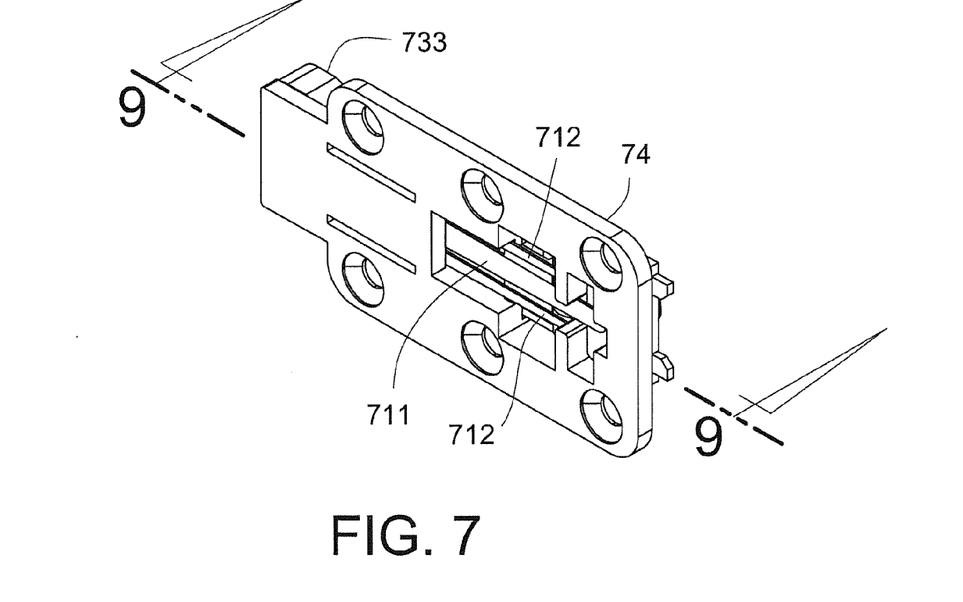
FIG. 7 is a rear perspective assembled view of the floating tenon, the restoring latching slide tenon and the latching/unlatching unit of the present invention.

Please refer to FIGS. 1 to 18. In the hanger device 30 for camera/filming equipment of the present invention, the latching/unlatching unit 70 further includes a first elastic member 71, a controlling/locking member 73 and a second elastic member 72. The first elastic member 71 directly or indirectly acts between the base seat 40 and the floating tenon 50. (It should be noted that in the embodiment shown by the drawings, the first elastic member 71 has an orifice 713 in which a boss 741 of a controlling/locking seat 74 is fixedly inlaid as which will be described hereinafter. However, the controlling/locking seat 74 is fixed on the base seat 40 so that the first elastic member 71 "indirectly" acts on the base seat 40. However, the first elastic member 71 can alternatively "indirectly" act on the base seat 40 and directly or indirectly act between the base seat 40 and the restoring latching slide tenon 60 as the above noted to make the floating tenon 50 and the restoring latching slide tenon 60 respectively elastically protrude into the hanging slide channel 41 in a floating state). The latching/unlatching unit 70 is locked in an installation recess 43 on the back face of the base seat 40 by six screws 75 as shown in FIG. 5 (in which only three screws are shown, while the other three are not shown due to limitation of the drawing). (The other part of the installation recess 43 is not shown. The configuration of the installation recess 43 matches that of the controlling/locking seat 74 for snugly fitting the controlling/locking seat 74 therein).

Figure 10:
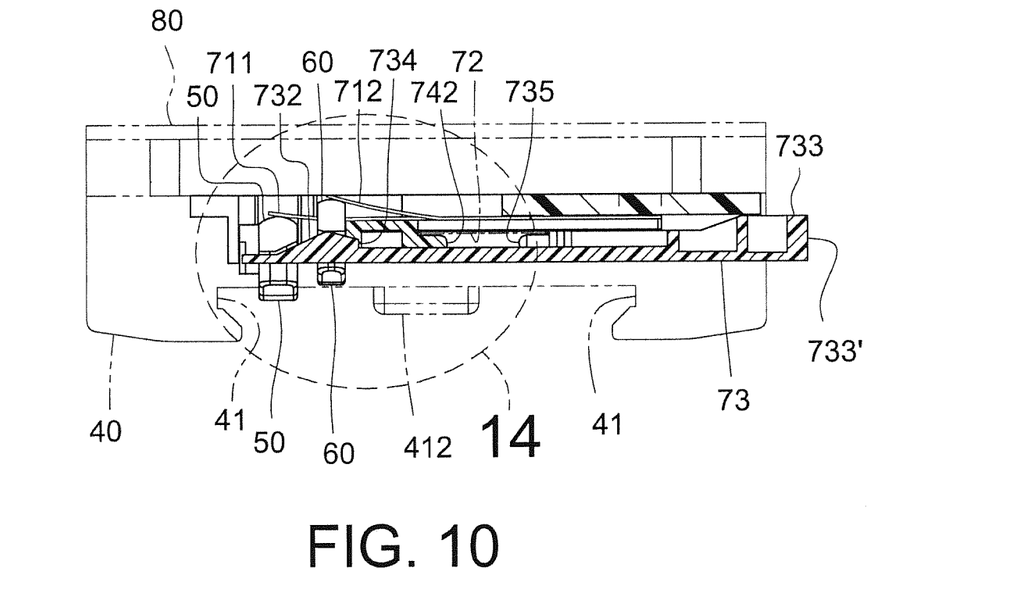
FIG. 10 is a plane sectional view according to FIG. 9.
Figure 11:
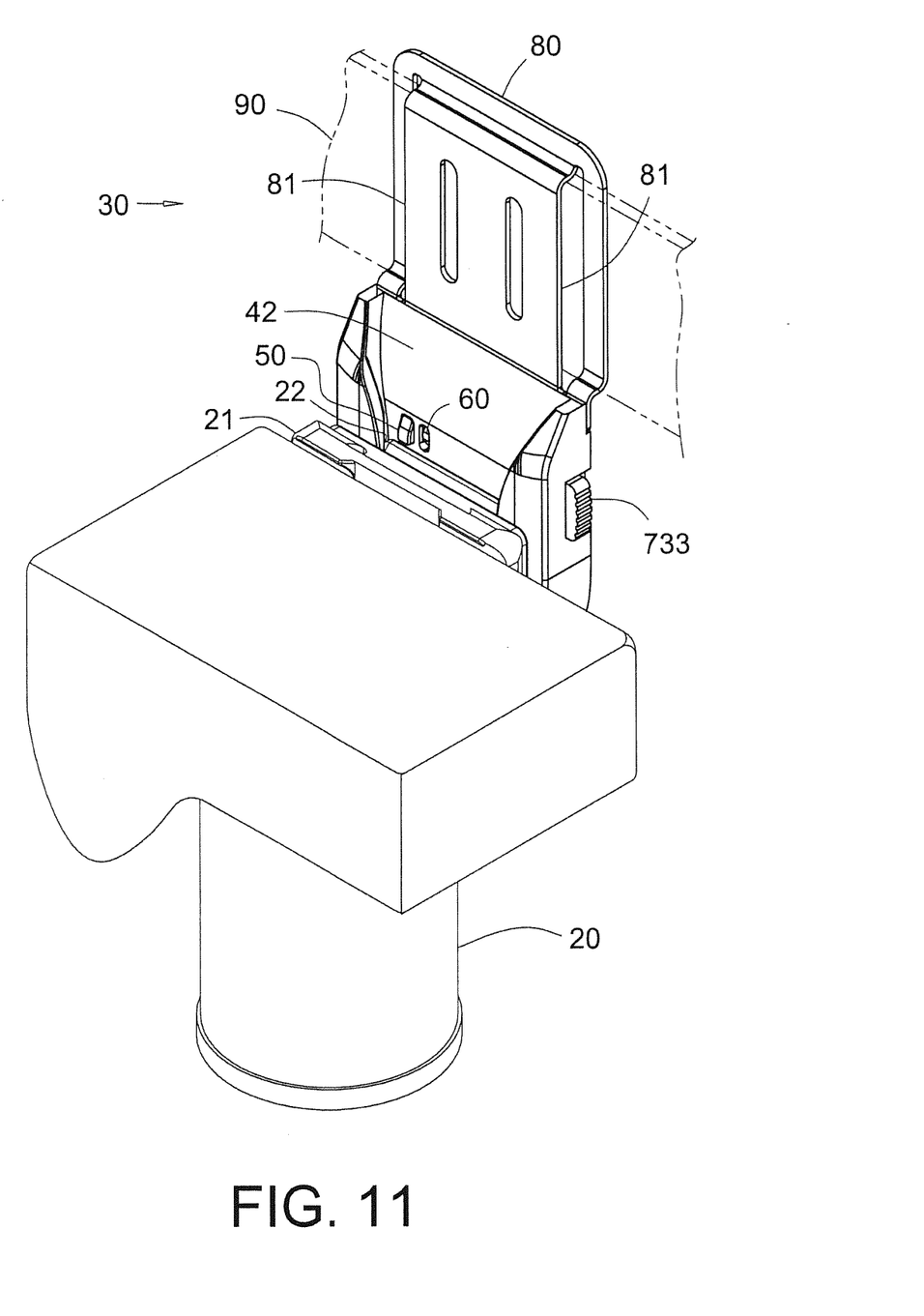
FIG. 11 is a perspective view of the present invention, showing that the camera/filming equipment with the quick release structure is hung in the present invention.
Figure 12:
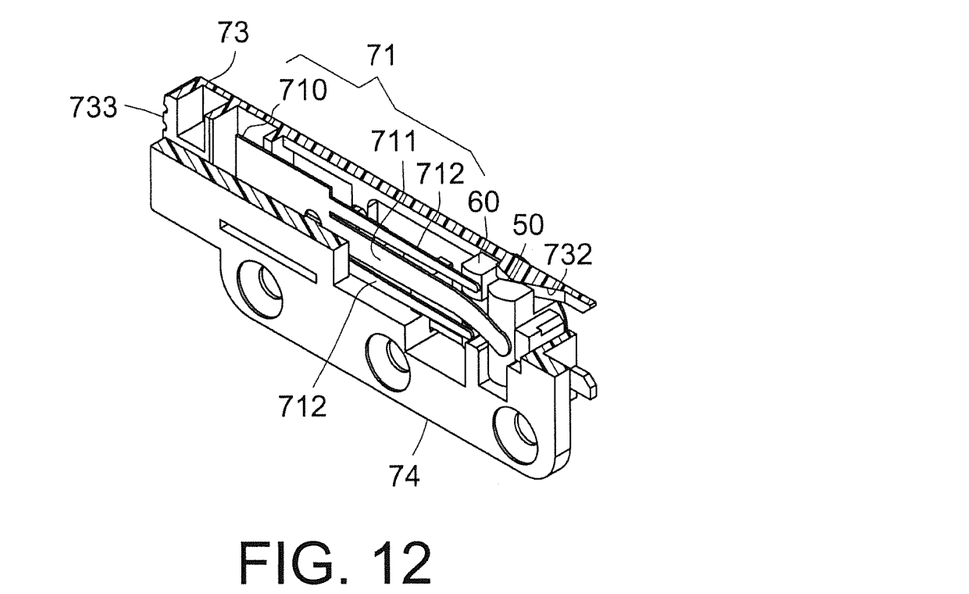
FIG. 12 is a partially perspective sectional view showing that the floating tenon of FIG. 9 is in an unlatched state.
Figure 13:
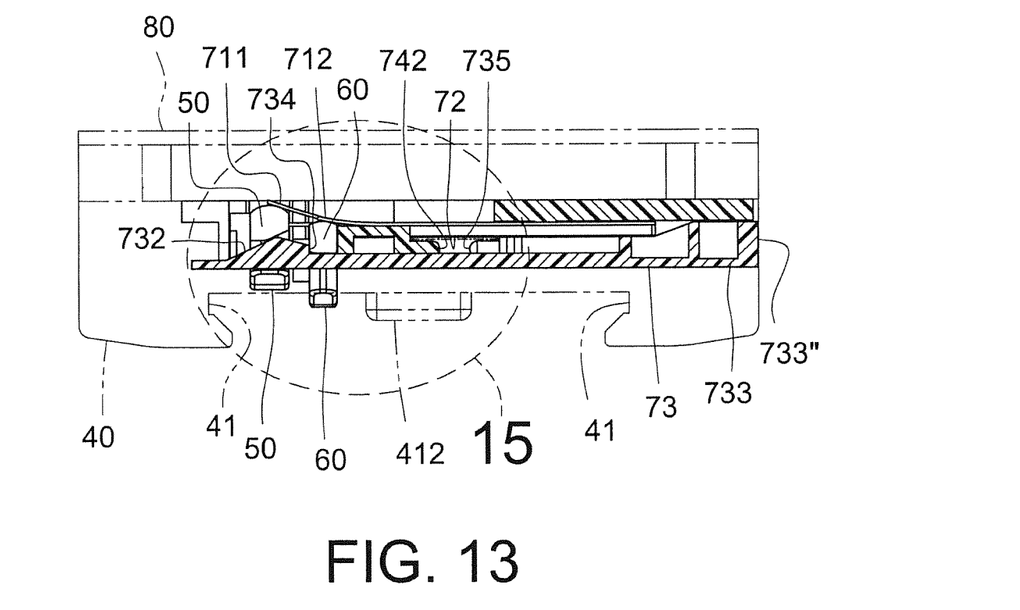
FIG. 13 is a plane sectional view according to FIG. 12.

Please refer to FIGS. 1 to 18. In the hanger device 30 for camera/filming equipment of the present invention, the controlling/locking member 73 is slidably disposed on the base seat 40. The controlling/locking member 73 has a press section 733, a first protrusion section 731, a second protrusion section 732 and a latch section 734. The press section 733 protrudes out of the base seat 40 for a user to press so as to slide the controlling/locking member 73 relative to the base seat 40. Also, the press section 733 can protrude out of the base seat 40 in a first position 733' (as shown in FIG. 10) or retract into the base seat 40 in a second position 733" (as shown in FIG. 13).

Figure 3:
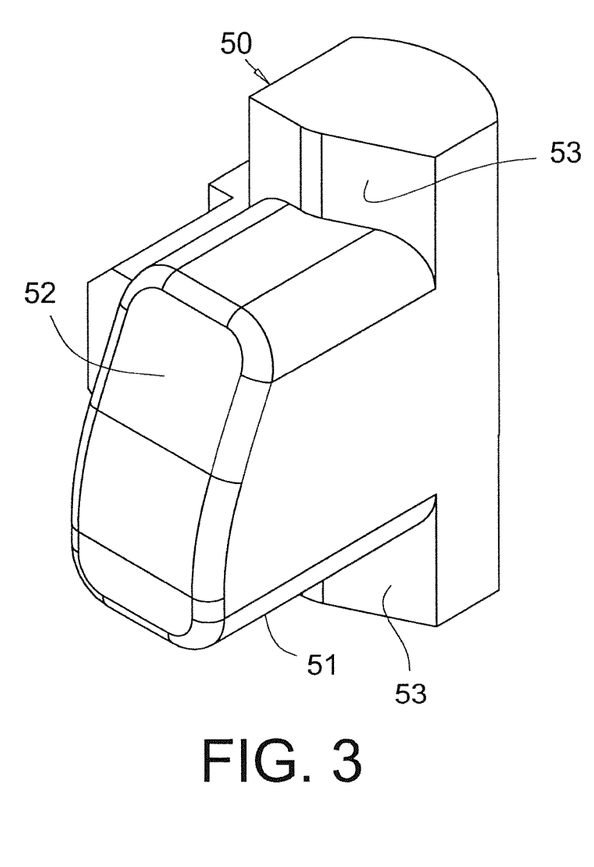
FIG. 3 is a perspective enlarged view of the floating tenon of the present invention.
Figure 14:
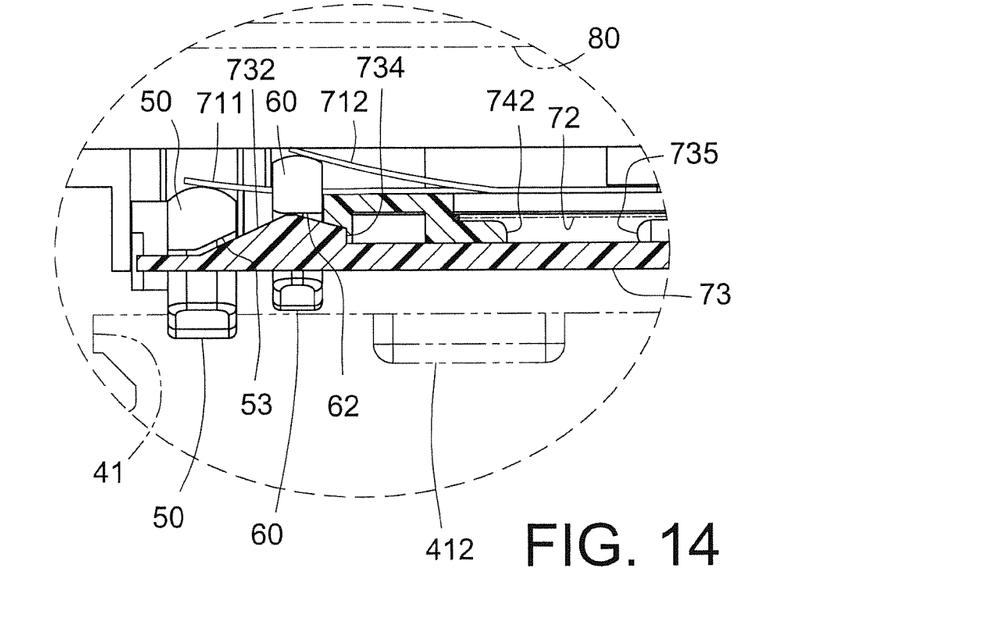
FIG. 14 is an enlarged view of circled area 14 of FIG. 10.
Figure 15:
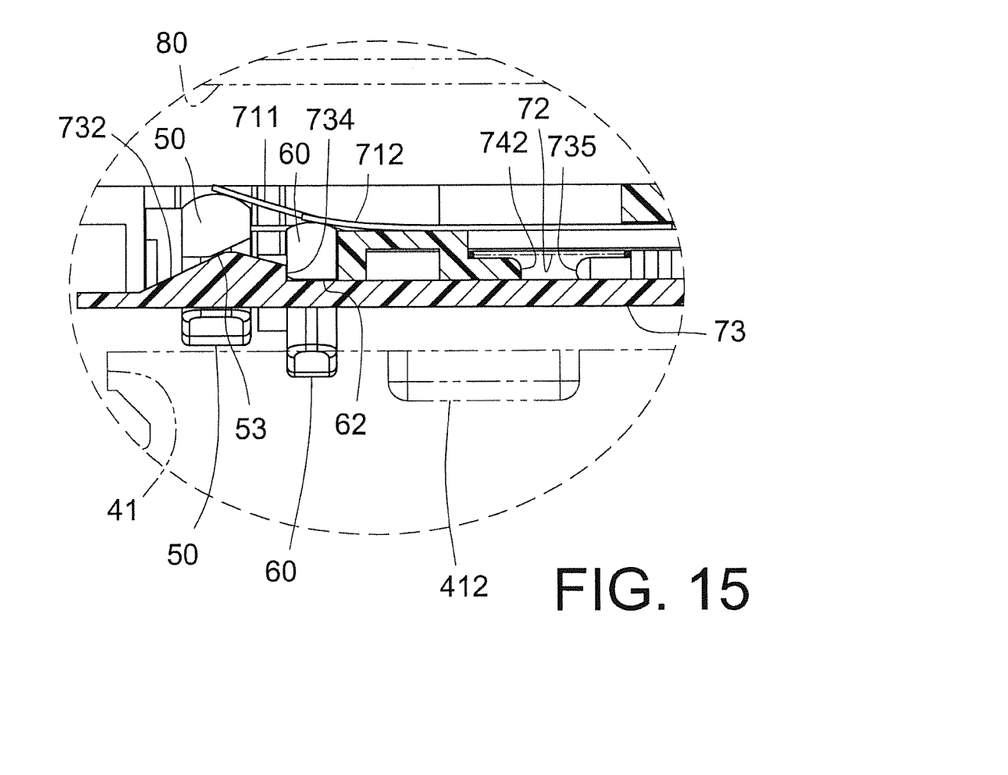
FIG. 15 is an enlarged view of circled area 15 of FIG. 13.
Figure 16:
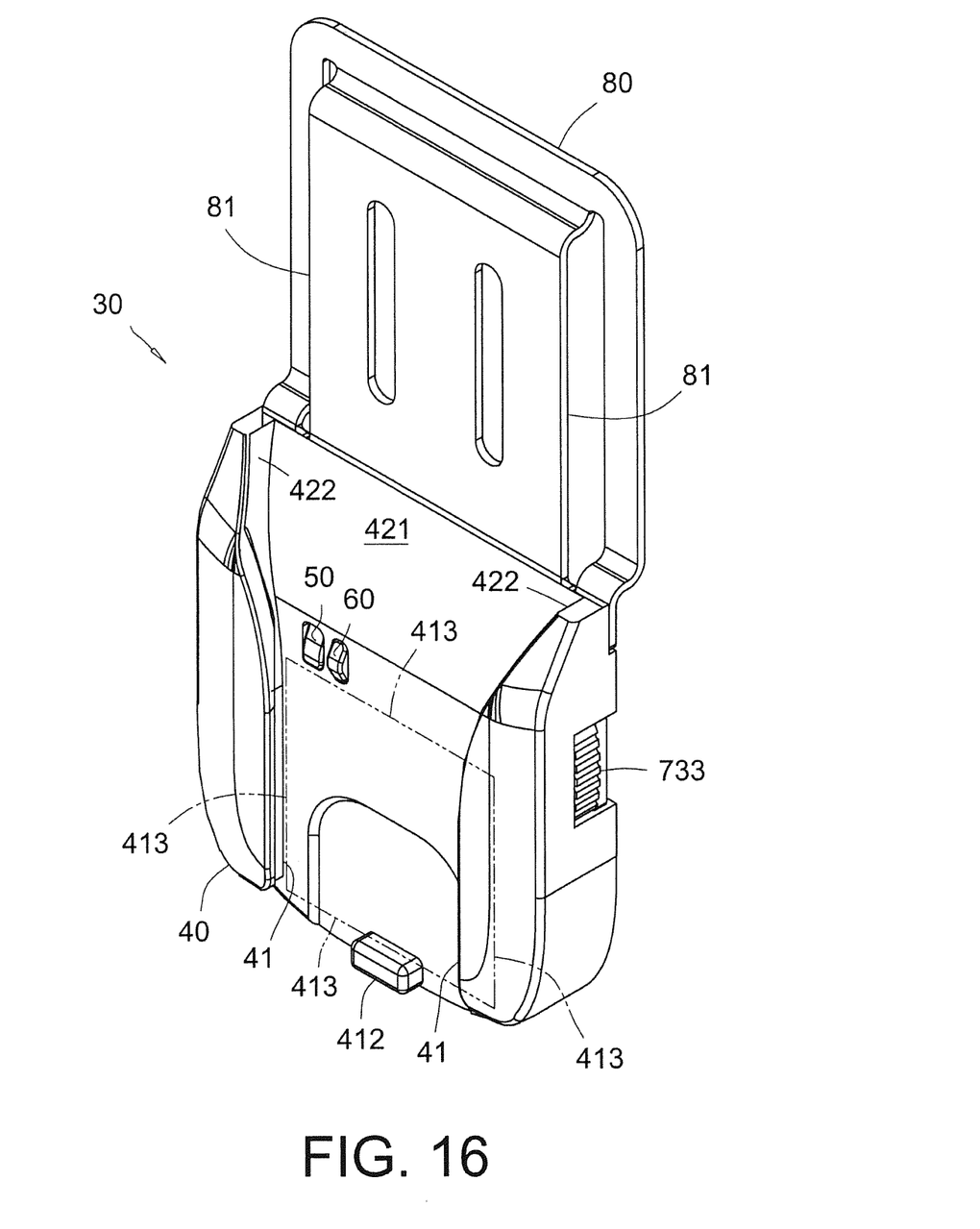
FIG. 16 is a perspective assembled view of the present invention.
Figure 17:
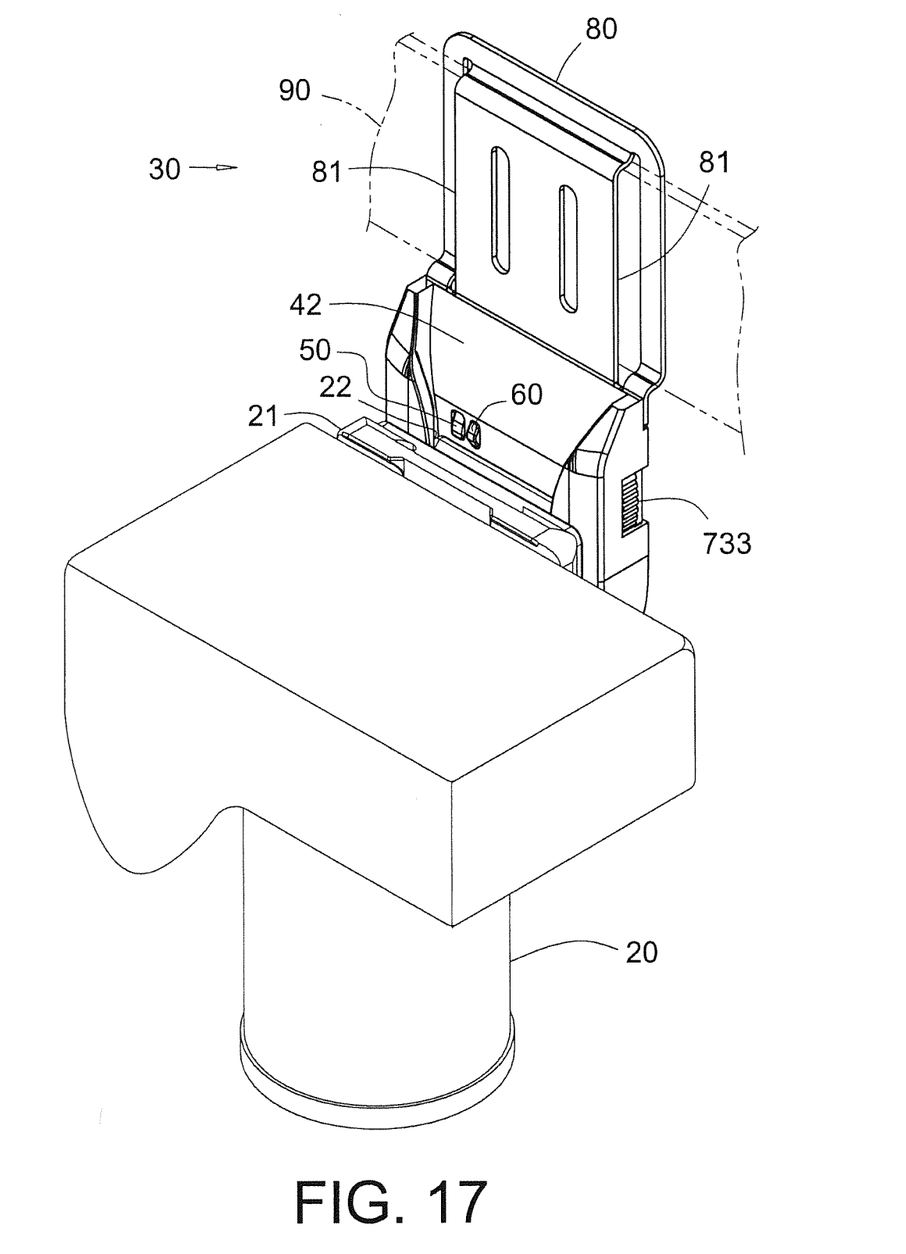
FIG. 17 is a perspective view showing the application of the present invention.

Please refer to FIGS. 1 to 18. In the hanger device 30 for camera/filming equipment of the present invention, the first protrusion section 731 is in driving contact with the floating tenon 50. That is, the floating tenon 50 has an action face 53 (as shown in FIGS. 3, 14 and 15) and the first protrusion section 731 of the controlling/locking member 73 presses against the action face 53 of the floating tenon 50 to sink the floating tenon 50 out of the hanging slide channel 41. The second protrusion section 732 is in driving contact with the restoring latching slide tenon 60. That is, the restoring latching slide tenon 60 has an action face 62 (as shown in FIGS. 3, 14 and 15) and the second protrusion section 732 of the controlling/locking member 73 presses against the action face 62 of the restoring latching slide tenon 60 to sink the restoring latching slide tenon 60 out of the hanging slide channel 41. When the press section 733 is retracted into the base seat 40, the latch section 734 latches one of the floating tenon 50, the restoring latching slide tenon 60 and the base seat 40 to keep the floating tenon 50 in an unlatched state and keep the restoring latching slide tenon 60 in a restoring latching state.

Please refer to FIGS. 1 to 18. In the hanger device 30 for camera/filming equipment of the present invention, the second elastic member 72 directly or indirectly acts between a locating pin 735 of the controlling/locking member 73 and the base seat 40. (It should be noted that in the embodiment shown by the drawings, two ends of the second elastic member 72 are respectively passed between the locating pin 735 of the controlling/locking member 73 and a locating pin 742 of the controlling/locking seat 74. However, the controlling/locking seat 74 is fixed on the base seat 40 so that the second elastic member 72 "indirectly" acts on the base seat 40. However, the second elastic member 72 can alternatively "indirectly" act on the base seat 40 to keep the controlling/locking member 73 in the latched state and keep the press section 733 of the controlling/locking member 73 in the first position 733').

Please refer to FIGS. 1, 11 and 16 to 18. The hanger device 30 for camera/filming equipment of the present invention further includes a pass hanger member 80 fixedly connected with the base seat 40. The pass hanger member 80 has two slots 81, 81 respectively formed on two sides of the pass hanger member 80 and extending along two sides of the opening 411 of the hanging slide channel 41 for a strap member 90 to pass therethrough so as to pass and hang the hanger device 30 for camera/filming equipment on the strap member 90. As shown in FIG. 5, the pass hanger member 80 has four through holes 82. Four screws 83 are respectively passed through the through holes 82 to lock the pass hanger member 80 on the back face of the base seat 40. Please refer to FIGS. 1, 11 and 16 to 18. The hanger device 30 for camera/filming equipment of the present invention further includes a controlling/locking seat 74. The floating tenon 50, the restoring latching slide tenon 60, the first elastic member 71, the controlling/locking member 73 and the second elastic member 72 are all drivably mounted in the controlling/locking seat 74.

Please refer to FIGS. 1 to 3 and 11 to 14. In the hanger device 30 for camera/filming equipment of the present invention, the first elastic member 71 has the form of a plate. The first elastic member 71 has a base section 710, a first elastic section 711 and two second elastic sections 712, 712. The base section 710 is directly fixed with the controlling/locking seat 74. The first elastic section 711 is integrally formed with the base section 710 to act on the floating tenon 50. The two second elastic sections 712, 712 are respectively integrally formed with the base section 710 and positioned on two sides of the first elastic section 711. The two second elastic sections 712, 712 respectively act on the restoring latching slide tenon 60.

Please refer to FIGS. 1, 5, 11 and 16 to 18. In the hanger device 30 for camera/filming equipment of the present invention, the two slots 81, 81 of the pass hanger member 80 are integrally formed on the pass hanger member 80.

Figure 18:
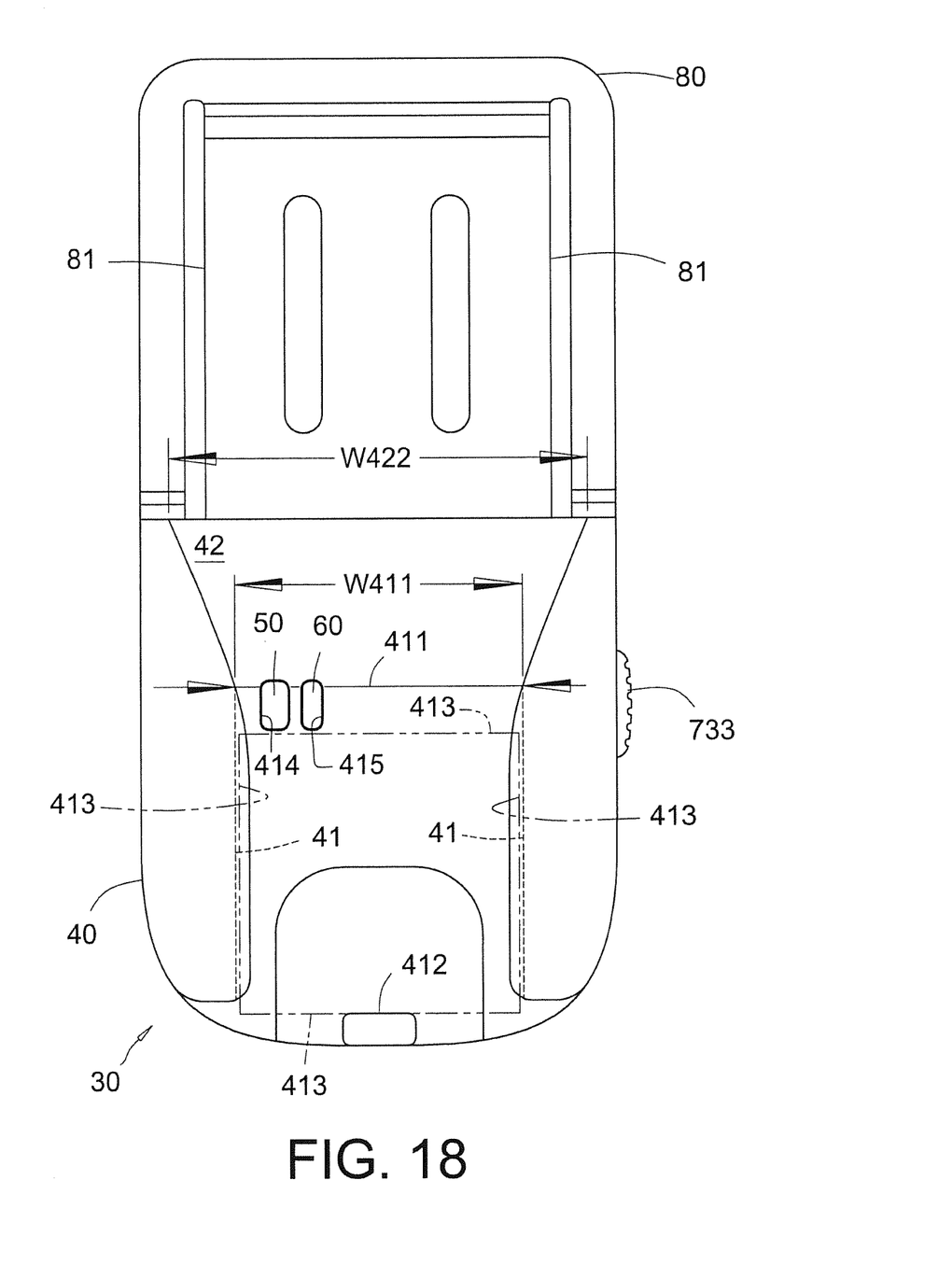
FIG. 18 is a front assembled view of the present invention.

Please refer to FIGS. 1, 5 and 18. In the hanger device 30 for camera/filming equipment of the present invention, the base seat 40 further includes a guide slide section 42 in adjacency to the opening 411 of the hanging slide channel 41. The guide slide section 42 has a guide slide slope 421 and two guide sidewalls 422, 422 positioned on two sides of the guide slide slope 421. The width W422 between the two guide sidewalls 422, 422 is larger than a width W411 of the opening 411 of the hanging slide channel 41.

Please refer to FIGS. 10 and 14. When a user presses the press section 733 of the controlling/locking member 73 to retract the press section 733 into the base seat 40, the floating tenon 50 is sunk out of the hanging slide channel 41 of the base seat 40. When the user releases the press section 733, the press section 733 still keeps retracted in the base seat 40. At this time, during the process that the user holds the camera/filming equipment 20 and upward slides the camera/filming equipment 20 from the hanging slide channel 41, the first slide connection section 22 of the quick release structure 21 connected with the camera/filming equipment 20 slides over the restoring latching slide tenon 60 and depress and sink the restoring latching slide tenon 60 out of the hanging slide channel 41. Under such circumstance, the restoring latching slide tenon 60 originally latched with the latch section 734 of the controlling/locking member 73 is separated from the latch section 734. The elastic force of the second elastic member 72 forces the press section 733 of the controlling/locking member 73 to rightward slide to the first position 733'. The second protrusion section 732 of the controlling/locking member 73 is rightward retreated. At this time, the floating tenon 50 originally pressed by the second protrusion section 732 to sink out of the hanging slide channel 41 is forced by the elastic force of the first elastic section 711 of the first elastic member 71 to automatically protrude into the hanging slide channel 41 in a floating state, waiting for the next time of sliding of the first slide connection section 22 of the quick release structure 21 connected with the camera/filming equipment 20 into the hanging slide channel 41 to automatically latch the camera/filming equipment 20.

Please refer to FIGS. 13 and 15. When the user presses the controlling/locking member 73 to make the press section 733 thereof leftward slide to the second position 733", the first and second protrusion sections 731, 732 of the controlling/locking member 73 respectively push the action faces 53, 53 on two sides of the floating tenon 50 (as shown in FIG. 3) to forcedly sink the floating tenon 50 out of the hanging slide channel 41 into an unlatched state. At the same time, two sides of the restoring latching slide tenon 60 are simultaneously forced by the elastic force of the two second elastic sections 712, 712 to make the restoring latching slide tenon 60 protrude into the hanging slide channel 41 in a floating state, that is, float on the hanging slide channel 41.

The hanger device 30 for camera/filming equipment of the present invention has the following advantages:

1. According to the hanger device 30 for camera/filming equipment of the present invention, when a user presses the press section 733 of the controlling/locking member 73 to retract the press section 733 into the base seat 40, once the camera/filming equipment 20 is upward slid out of the hanging slide channel 41, the floating tenon 50 will automatically protrude into the hanging slide channel 41 in a floating state and restore to the automatically latchable state. To a user, once the quick release structure 21 connected with the camera/filming equipment 20 is slid into the hanging slide channel 41, the floating tenon 50 will automatically latch the camera/filming equipment 20. This is quite safe.

2. According to the hanger device 30 for camera/filming equipment of the present invention, once the camera/filming equipment 20 is hung into the hanger device 30 for camera/filming equipment, the hanger device 30 will immediately automatically latch the camera/filming equipment 20 to avoid drop of the camera/filming equipment 20.

3. According to the hanger device 30 for camera/filming equipment of the present invention, a user can hang the camera/filming equipment 20 into the hanging slide channel 41 in a desired direction and latch the camera/filming equipment 20 in a fixed direction without shaking or swinging. Therefore, the camera/filming equipment 20 will not interfere with the motion of the user. In this case, the user can more reassuringly and fluently move his/her body to perform various shooting activities. The above embodiments are only used to illustrate the present invention, not intended to limit the scope thereof. Many modifications of the above embodiments can be made without departing from the spirit of the present invention.

What is claimed is:

1. A hanger device for camera/filming equipment, the camera/filming equipment being connected with a quick release structure, the quick release structure at least having a first slide connection section, the hanger device for camera/filming equipment comprising:
   (A) a base seat including a hanging slide channel, the hanging slide channel having an opening formed at one end of the hanging slide channel for the first slide connection section of the quick release structure to slide from the opening into the hanging slide channel, the base seat further including a terminal section disposed at the other end of the hanging slide channel for bracketing one end of the first slide connection section to stop the first slide connection section from further sliding along the hanging slide channel;
   (B) a floating tenon elastically disposed on the base seat and distal from the terminal section, whereby the floating tenon can protrude into the hanging slide channel in a floating state or sink out of the hanging slide channel, the floating tenon and the terminal section together defining a latching section in the hanging slide channel, when the floating tenon protrudes into the hanging slide channel in a floating state, the floating tenon stopping one side of the first slide connection section of the quick release structure to latch the first slide connection section in the latching section, when the floating tenon sinks out of the hanging slide channel, the first slide connection section being permitted to slide out of the hanging slide channel from the opening thereof to separate from the hanging slide channel;
   (C) a restoring latching slide tenon elastically and floatably/sinkably disposed on the base seat, the restoring latching slide tenon being positioned outside the latching section in the hanging slide channel, in the separation travel of the first slide connection section of the quick release structure from the hanging slide channel, the restoring latching slide tenon being depressed by the first slide connection section to sink out of the hanging slide channel, when the floating tenon sinks out of the hanging slide channel in an unlatched state, the restoring latching slide tenon elastically protruding into the hanging slide channel in a floating state, in a floating/sinking cycle, the restoring latching slide tenon serving to restore the floating tenon and keep the floating tenon in a restoring latching state; and
   (D) a latching/unlatching unit disposed on the base seat for driving the floating tenon to latch/unlatch the first slide connection section and driving the restoring latching slide tenon to restore the floating tenon to the restoring latching state.

2. The hanger device for camera/filming equipment as claimed in claim 1, wherein the floating tenon further has:
   (A) a latching face directed to the terminal section to stop the other end of the first slide connection section of the quick release structure and latch the first slide connection section in the latching section; and
   (B) a first guide slide slope directed away from the latching face, permitting the first slide connection section of the quick release structure to slidably press against the first guide slide slope to smoothly depress and sink the floating tenon out of the hanging slide channel.

3. The hanger device for camera/filming equipment as claimed in claim 2, wherein the restoring latching slide tenon further has a second guide slide slope, in the unlatched state, the second guide slide slope protruding into the hanging slide channel in a floating state, one end of the second guide slide slope being defined as a start end of the second guide slide slope, the start end being directed to the terminal section, whereby in the sliding travel of the first slide connection section of the quick release structure out of the latching section, the start end can guide the first slide connection section to slidably press thereagainst to smoothly depress and sink the restoring latching slide tenon out of the hanging slide channel, the other end of the second guide slide slope being defined as a terminal end of the second guide slide slope, the terminal end being directed away from the terminal section.

4. The hanger device for camera/filming equipment as claimed in claim 3, wherein the latching/unlatching unit further includes:
   (A) a first elastic member, the first elastic member directly or indirectly acting between the base seat and the floating tenon and directly or indirectly acting between the base seat and the restoring latching slide tenon to make the floating tenon and the restoring latching slide tenon respectively elastically protrude into the hanging slide channel in a floating state;
   (B) a controlling/locking member slidably disposed on the base seat, the controlling/locking member having:
      (a) a press section protruding out of the base seat for a user to press so as to slide the controlling/locking member relative to the base seat, when the press section protrudes out of the base seat, the press section being positioned in a first position, when the press section retracts into the base seat, the press section being positioned in a second position;
      (b) a first protrusion section in driving contact with the floating tenon for sinking the floating tenon out of the hanging slide channel; and (c) a second protrusion section in driving contact with the restoring latching slide tenon for sinking the restoring latching slide tenon out of the hanging slide channel; and (d) a latch section, when the press section is retracted into the base seat, the latch section latching one of the floating tenon, the restoring latching slide tenon and the base seat to keep the floating tenon in an unlatched state and keep the restoring latching slide tenon in a restoring latching state; and (C) a second elastic member directly or indirectly acting between the controlling/locking member and the base seat to keep the controlling/locking member in the latched state and keep the press section of the controlling/locking member positioned in the first position.

5. The hanger device for camera/filming equipment as claimed in claim 4, further comprising a pass hanger member fixedly connected with the base seat, the pass hanger member having two slots respectively formed on two sides of the pass hanger member and extending along two sides of the opening of the hanging slide channel for a strap member to pass therethrough so as to pass and hang the hanger device for camera/filming equipment on the strap member.

6. The hanger device for camera/filming equipment as claimed in claim 5, wherein the two slots of the pass hanger member are integrally formed on the pass hanger member.

7. The hanger device for camera/filming equipment as claimed in claim 4, further comprising a controlling/locking seat, the floating tenon, the restoring latching slide tenon, the first elastic member, the controlling/locking member and the second elastic member being all drivably mounted in the controlling/locking seat.

8. The hanger device for camera/filming equipment as claimed in claim 7, wherein the first elastic member has the form of a plate, the first elastic member having:

(A) a base section directly fixed with the controlling/locking seat;

(B) a first elastic section integrally formed with the base section to act on the floating tenon; and (C) two second elastic sections respectively integrally formed with the base section and positioned on two sides of the first elastic section, the two second elastic sections respectively acting on the restoring latching slide tenon.

9. The hanger device for camera/filming equipment as claimed in claim 1, wherein the base seat further includes a guide slide section in adjacency to the opening of the hanging slide channel, the guide slide section having a guide slide slope and two guide sidewalls positioned on two sides of the guide slide slope, a width between the two guide sidewalls being larger than a width of the opening of the hanging slide channel.

* * * * *